Oct. 12, 1943.  R. D. PEARSON  2,331,856
FILTER CONSTRUCTION
Filed June 24, 1940
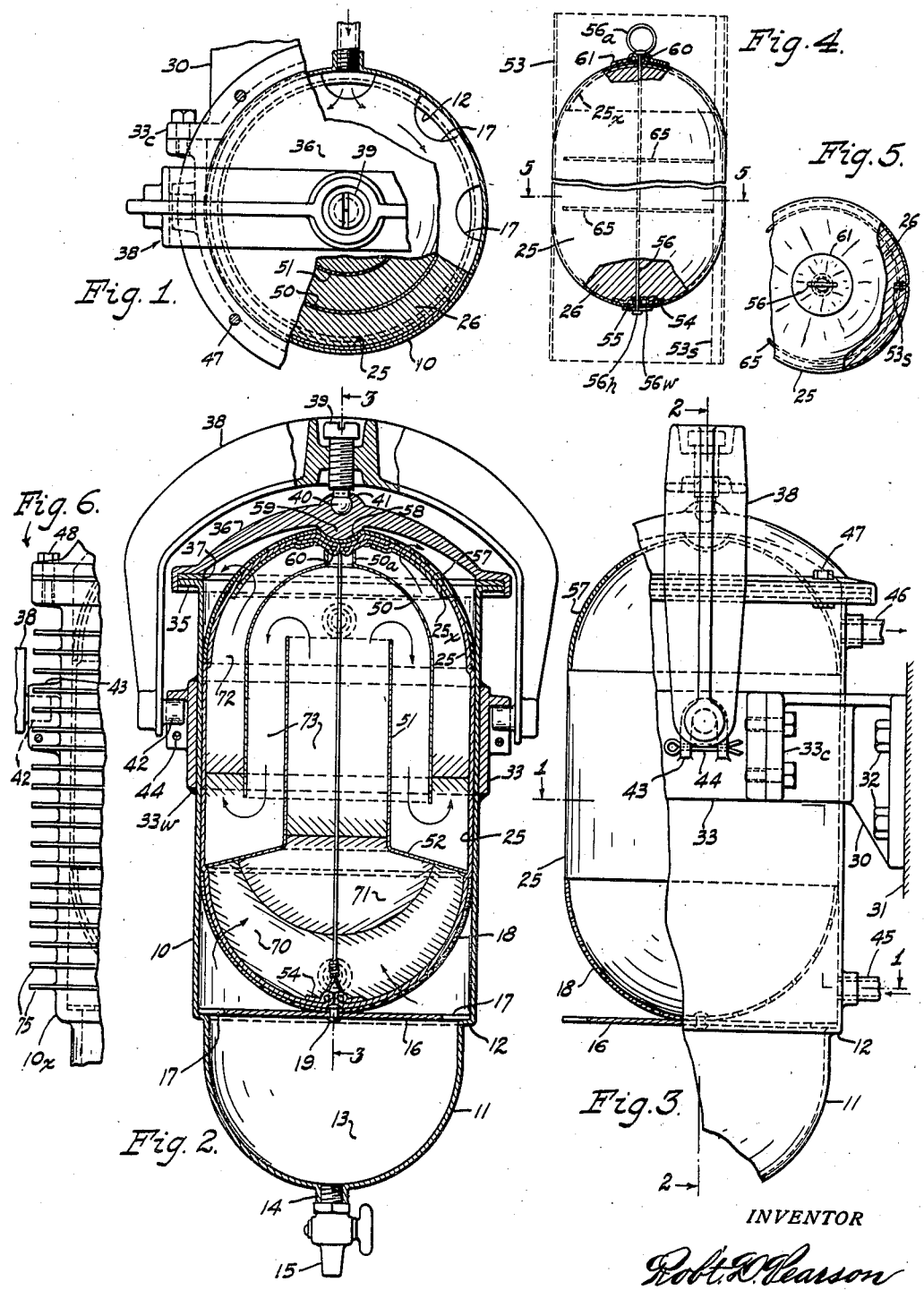
INVENTOR
Robt. D. Pearson Patented Oct. 12, 1943

2,331,856

UNITED STATES PATENT OFFICE 2,331,856

FILTER CONSTRUCTION

Robert D. Pearson, Los Angeles, Calif.

Application June 24, 1940, Serial No. 342,078

10 Claims. (Cl. 210—131)

This invention relates to a filter construction.

The filter construction to which this invention pertains is adapted for a great variety of uses, but is more particularly intended for service as a water filtering means and as a means for removing impurities from oils and oily substances.

Among the objects of the invention are: To construct a filtering device in a very compact manner while still maintaining efficient function as a filter, the device being sufficiently small for installing upon the oil circulatory system of a self-propelled vehicle so that all the oil being circulated through the engine may be passed through the filter in a sufficiently free manner to avoid any objectionable retarding of its flow; to provide an improved cartridge sack for containing the filtering substances; to provide within the cartridge or sack which contains the filtering material an improved means for causing the liquid to flow through all portions of the body of filtering material within the sack; to provide means for supporting the filtering material within a sack or perforated container which is shaped in an improved manner in its relation to the adjacent part of the filter structure with which it co-operates, so that the liquid being filtered will enter such sack more freely; and to, in various other particulars, improve upon the construction of a filter of the class to which the invention pertains in regard to simplicity, reduced cost of construction and greater facility with which the various parts of the device may be assembled and disassembled.

The invention further pertains to a new and improved method of constructing a sack for containing the body of filtering material used in the device, and to the method of enclosing said material within said sack.

Referring to the accompanying drawing which illustrates what is at present deemed to be a preferred embodiment of the invention, Fig. 1 is a top plan view of the device, upper portions thereof being broken away in order to disclose underlying parts more clearly, said underlying parts being sectioned on angular line 1—1 of Fig. 3.

Fig. 2 is a vertical mid-section on line 2—2 of Fig. 3, except that some parts near the plane of section are shown in elevation.

Fig. 3 is an elevation looking from right to left in relation to Fig. 2, portions of the housing being broken away on section line 3—3 of Fig. 2, in order to disclose the interior construction more clearly.

Fig. 4 is a view, partly in elevation and partly in vertical mid section, illustrating, in a filled condition, the liquid pervious sack which contains the body of filtering material, the mid length portion of the sack being broken away in order to contract the length of the view. The exterior dotted lines indicate the shape of the fabric sleeve from which the sack is made.

Fig. 5 is a plan view of the sack shown in Fig. 4, partly sectioned on line 5—5 of Fig. 4.

Fig. 6 is a fragmental elevation of a modified filter housing which is furnished with heat radiating fins.

Referring in detail to the drawing, the filter housing includes a deep drawn or seamed type tube 10 having a hemispherical bottom portion 11 which is joined to the body portion of said housing by means of an inwardly directed annular shoulder 12. Said portion 11 forms a trap which contains a sediment chamber 13. At its lower end said trap has an outlet connection 14 provided with a faucet 15. A circular plate 16 rests removably upon said annular shoulder 12, said plate having through it apertures 17 to admit sediment to the chamber 13 of the trap. Upon the central portion of said plate 16 rests a foraminated, concavo-convex, desirably hemispherical plate 18, the latter plate being shown attached to the former by a rivet 19.

Said foraminated plate 18, having its concave face directed upwardly, constitutes a seat or rest member into which is nested the lower end portion of a liquid pervious fabric sack 25 which contains a body of granular or flaky filtering material 26.

The filter housing may be supported in any suitable manner, for example, by a bracket 30 which is shown secured to a wall member 31 by means of screw bolts 32. Said bracket is shown as an extension of a mounting ring 33 which is fitted around the housing in a friction tight manner or is secured thereto by any suitable conventional means, such as by welding 33w or by a clamp structure 33c.

The upper end of the housing is shown furnished with an outwardly directed annular flange 35 upon which is seated a convex cover 36, a gasket 37 being shown between said cover and flange. Said cover is shown held in place by a swingable clamping bail 38 carrying in its middle portion a clamping screw 39 having a globular end portion 40 rotatably engaging a peened over seat 41. The lower ends of the bail arms are shown having inwardly directed lugs 42 engaging under yokes 43 carried by the band 33, and held in place by cotter pins 44.

In order to cause the liquid being filtered to circulate through the body of filtering material in as efficient a manner as possible, a two-part liquid guiding means is provided within the body of filtering material contained within the sack 25. One of the parts of said means is a cup shaped cylindrical member 50 and the other part thereof is an open ended tubular member 51 having a laterally and outwardly directed flange 52 around one of its ends. The external diameter of said flange is substantially the same as the internal diameter of the widest part of the hemispherical plate 18, hence the inserted tubular member 51 is maintained in an axial relation to the body of filtering material in which it is embedded, and all the inflowing liquid is caused to pass through the tube. In order to facilitate directing of the liquid into the tube said flange 52 is inclined away from the tubular portion of the member of which it forms a part.

The liquid being filtered is, ordinarily, caused to flow upwardly, through the device, therefore the flanged end portion 52 of the tubular member is directed downwardly toward the inflowing liquid, and the open end of the cup 50 is similarly directed. The tubular member is inwardly spaced from the sides of the cup, and its open top end is downwardly spaced from the bottom of the inverted cup. Also the open end of the cup is spaced vertically above the flange 52. An opening in the bottom of the cup 50 is surrounded by an outwardly directed spacing flange 50a.

It will be seen that this arrangement of the two members 50 and 51 will guide the liquid flow first in one direction and then in the opposite direction in regard to the length of the filtering chamber and will cause an efficient circulation of the liquid throughout all portions of the body of filtering material.

The inlet connection 45 is located slightly above the plate 16 and directs the liquid horizontally into the annular space superjacent to the plate 16 and surrounding the downwardly convex plate 18. Said plate 16 constitutes a transverse partition which occupies the entire cross-sectional area of the part of the filter chamber in which it is located. The incoming liquid stream will be spread by contact with the plate 18, as indicated by the arrows in the upper part of Fig. 1, and owing to the openings 17 of the plate 1 being positioned in the peripheral portion of said plate, the stream will not pass directly into or disturb the contents of the trap 13, but sediment from the stream will gradually settle into said trap.

The outlet connection 46 is located above the lower portion of the top foraminated cap plate 57 and is shown at the same side of the filter as the inlet. A by-pass conduit of a conventional kind may be provided outside the filter between the connections 45 and 46, to allow obstructed liquid, if subjected to an excessive pressure, to by-pass the filter body.

In regard to the perforations of the lower convex plate 18 and those of the similarly shaped upper plate 57, the perforations of the former plate are smaller, but are sufficiently more numerous than those of the latter to cause the entrance of the liquid into the filtering body to be less obstructed than its outflow therefrom.

Bolts 47 are indicated in Fig. 3, and cap screws 48 in Fig. 6 as auxiliary means for securing the cover 36 in its closed position.

The invention includes the provision of an improved fabric container for a body of flaky or granular filtering material, this sack being illustrated in detail in Figs. 4 and 5.

In making said sack, an open ended sleeve 53 of liquid pervious fabric is first prepared, either by seamless weaving or by the formation of a longitudinally extending seam 53s, and then one end portion of said sleeve is closed by puckering 54 and is tied in its closed condition, for example, by means of a connection 55. The sack thus formed is turned inside out thereby bringing interiorly its seam (if present) and puckered portion. Then the body of granular or flaky filtering material is supplied to the sack through its upper open end.

A traction means consisting of a wire 56 fastened at its lower end to the cord 55 may be supplied to aid the operator to remove the filled sack from the filter without destroying said sack, said wire having a finger loop 56a in its upper end.

It may not in all cases be deemed necessary to use the liquid guiding members 50 and 51, but when this is done the tubular member 51 will be inserted to the position shown in Fig. 2 in relation to the sack after the downwardly convex lower portion of the body of filtering material has been tamped into place approximately as shown in this view. Fig. 2 illustrates the relation between the sack and its contents, but it is to be understood that the filled sack or cartridge will be prepared outside of the filter housing for subsequent insertion into its nested relation to the concave supporting plate 18.

After inserting the tubular member 52 within the sack in the manner stated, the remainder of the body of filtering material will be supplied thereto and then the inverted cup shaped member 50 will be forced down into place to nearly the position shown in Fig. 2, the final portion of the downward movement of said member 50 taking place after the inserted sack has been capped with the perforated top hemispherical cover plate 57 having a central depression 58 engaged by the downwardly directed boss 59 of the clamping cover 36.

After the desired quantity of the filtering material has been placed within the sack 55 its top is closed around the upwardly extended wire 56, by puckering 61 and is fastened in its closed condition by some suitable means, for example the cord 60.

In Figs. 4 and 5, a plurality of stay wire hoops 65 is shown to restrain the packed in contents of the sack from distending its walls to too great an extent, these wires being more particularly intended for use when a filling of the character of chemically treated rags or fibers is used for filtering purposes.

In Fig. 4 the loop 56a of the axial connection 56 is clearly shown, but said loop does not appear in Fig. 2 because it is deflected by the boss 59 of the cover 36.

In Fig. 2 a laminated arrangement of different kinds of filtering material is shown. In this view the lower layer 70 is shaped, as seen in vertical section, as a truncated crescent with its concave face uppermost, the outer portion of the liquid guiding flange 52 engaging the truncated part of the crescent. Said layer 70 is composed of a relatively wide mesh or coarse filtering material. Upon its central portion is imposed a layer 71 of a somewhat finer meshed filtering material, while the remaining portion of the filtering body (except the layer 72 above and around the inverted cup 50) is composed of a yet smaller meshed filtering material 73. The layer 72, through which the liquid passes last, may be provided with liquid bleaching chemicals.

The upper portion of the sack 25 is shown interiorly reinforced at 25x to safeguard it against rupturing opposite to the perforations of the foraminated convex plate 57 which is superimposed upon it.

In the modified structure at the lower end of the sack shown in Fig. 4, a washer 56w is shown underlying the sack, the wire 56 passing through said washer and having a head 56h abutting the lower face of said washer.

In Fig. 6 is shown a fragment of a modified housing or casing 10x for the filter, which is furnished with a multiplicity of heat radiating fins 75.

The heated liquid, particularly oils, can be more advantageously filtered; but it is desirable that it be delivered from the filter in as cool a condition as possible.

What is claimed is:

1. In a filter, a casing having within it a substantially cylindrical elongated chamber, means to support said casing with said elongated chamber extending vertically, a sack for containing filtering material, said sack being filled with a body of filtering material and being fitted within said cylindrical chamber in a close contact with the vertical wall portion of said chamber, said casing having an apertured, transversely extending wall equal in extent to the cross-section of said chamber, said wall being spaced below aforesaid sack fitted in the casing, said casing being furnished with a foraminated seat plate resting upon said wall to maintain lower end portions of said sack in an upwardly spaced relation to said apertured wall, a portion of said casing forming a trap underlying said wall to receive sediment passing downwardly through the latter, inlet means for said casing communicating therewith between said apertured wall and lower end portions of said sack and an outlet means leading from said casing above said sack.

2. The combination, with a housing having within it an elongated chamber and a body of filtering material within said chamber filling the mid-length portion thereof; of an open ended liquid directing tube embedded within said body, said tube extending lengthwise of said chamber, the axis of said tube substantially coinciding with the axis of said chamber, liquid obstructing means at one end of said tube which bridges the space between that end of the tube and the surrounding wall portion of the aforesaid chamber; and a cup shaped member into which the opposite end portion of said tube extends and terminates in a spaced relation both to the bottom and surrounding side portion of said cup shaped member, said member having its bottom and side portions in an internally spaced relation to said chamber and having its open end in a spaced relation to the aforesaid liquid obstructing means, and foraminated means to hold said body of filtering material in place within said chamber, there being passages for liquid flow in opposite ends of the housing communicating with said chamber.

3. The subject matter of the foregoing claim 1 and, the lower end portion of said sack being surrounded by an annular chamber, said inlet means consisting of a tube having a substantially horizontal discharge end portion communicating with said annular chamber.

4. The combination, with a housing having within it an elongated chamber and a body of filtering material within said chamber filling the mid-length portion thereof; of an open ended liquid directing tube embedded within said body, the axis of said tube substantially coinciding with the axis of said chamber, said tube having at one end an outwardly directed circumferential flange which bridges the space between that end of the tube and the surrounding wall portion of the aforesaid chamber; and a cup shaped member into which the unflanged end portion of said tube extends and terminates in a spaced relation both to the bottom and surrounding side portions of said cup shaped member, said member having its bottom and side portions in an internally spaced relation to said chamber and having its open end in a spaced relation to the aforesaid flange of said tube; and foraminated means to hold said body of filtering material in place within said chamber, there being passages for liquid flow in opposite ends of the housing communicating with said chamber.

5. In a filter, a cylindrical upstanding casing having within its lower end portion an internal annular shoulder and a sediment chamber below said shoulder, a circular apertured plate resting removably upon said shoulder, said plate including within its periphery the entire space surrounded by said casing, a concavo-convex foraminated plate centrally secured to the central portion of said apertured plate with its concave side directed upwardly, a body of filtering material within said casing having a lower end portion nested within the concavo side of said foraminated plate, an outlet liquid passage communicating with said casing above said body of filtering material, and an inlet passage leading into said chamber between said apertured plate and the peripheral portion of said foraminated plate.

6. In a filter, the combination, with a housing having within it an elongated chamber furnished in one end portion with inlet means and in its opposite end portion with outlet means; of a body of filtering material supported within said chamber within a liquid pervious containing means, said body being positioned in the path of all portions of the liquid flowing through said chamber from said inlet means to said outlet means, and liquid guiding means supported within said body of filtering material and having reversely directed communicating conduit portions whereby the liquid is conducted first in one direction with respect to the length of said chamber, and then in the opposite direction in respect to the length thereof, said means for causing the liquid being filtered to flow in reverse directions consisting of two liquid directing members one of said members being cup-shaped and the other of said members consisting of an open-ended tubular portion mounted in a concentric inwardly spaced relation to the sides and bottom of said cup-shaped member, said cylindrical member having a laterally directed flange around its outer end, said flange being outwardly directed and in a spaced relation to the open-end of said cup-shaped member, the axis of each of said liquid directing members extending longitudinally of the aforesaid elongated chamber.

7. As an article of manufacture, a cartridge for filters, a body of filtering material within said cartridge, said cartridge including a liquid pervious fabric sack enclosing said body of filtering material and having embedded therewithin a substantially cup shaped member, the bottom of said cup shaped member having through it a central opening surrounded by an annular flange which is directed away from the mouth of the cup, the edge of said flange being in an internal substantially abutting relation to one end portion of the sack, the axis of said cup extending lengthwise of said sack, a traction connection fastened to the opposite end portion of the sack and thence extending through said body of filtering material and through the space enclosed by said flange to a point external to the sack, the mouth of said cup being surrounded by a clearance within the sack and being in an internally spaced relation to the end of the sack to which said traction connection is fastened, a tubular liquid collecting tube extending axially of the cartridge, said tube having one of its end portions terminating in a spaced relation both to the bottom and side portions of said cup shaped member, and a liquid obstructing means in a spaced relation to the mouth of said cup and bridging the space between the opposite end portion of said tube and the surrounding wall of the cartridge.

8. The subject matter of claim 7 and, a cap plate, the adjacent end portion of the sack being interposed between the edge of said flange and said cap plate, said cap plate having a centering projection which extends into the outer portion of said flange.

9. In a filter, a cylindrical, elongated casing, a filling of filtering material therewithin, a cylindrical member including within its periphery a liquid obstructing portion and of less diameter than said casing and located therewithin in an internally spaced relation to the wall thereof, the axis of said member coinciding with the axis of said casing, thereby providing an annular passage between said member and the casing wall to cause liquid passing through said filling to flow close to the wall of said casing, a liquid inlet means at one end of the casing, a liquid outlet means for the opposite end thereof, and exterior heat radiating fins carried by that portion of the casing wall which surrounds the aforesaid annular passage.

10. In a filter, an elongated, cylindrical casing having inlet and outlet means, a filling of filtering material within said casing, a tubular member embedded within said filtering material and having ends open to liquid flow, said member extending lengthwise of said casing and being located centrally thereof, means whereby the liquid inflow is directed into one end of said tubular member, a cylindrical member surrounding the opposite end portion of said tubular member, said cylindrical member being of less diameter than said casing and of greater diameter than said tubular member and having a liquid obstructing portion spaced away from the liquid outflow end of said tubular member; thereby providing reversely directed inner and outer annular communicating channels so that the liquid is caused to flow first through said tubular member, then to leave the outflow end thereof and flow in a reverse direction through the annular space between said members to the end of said cylindrical member and thence to again flow reversely close to the wall of the casing toward the outlet thereof.

ROBERT D. PEARSON.